Oct. 3, 1967    M. G. GRODBERG ETAL    3,345,265
MULTIPLE LAYER TABLET WITH CALCIUM SALT CENTRAL CORE
SEPARATED FROM SOLUBLE FLUORIDE OUTER COATING
Filed Oct. 9, 1963
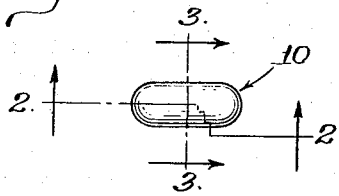
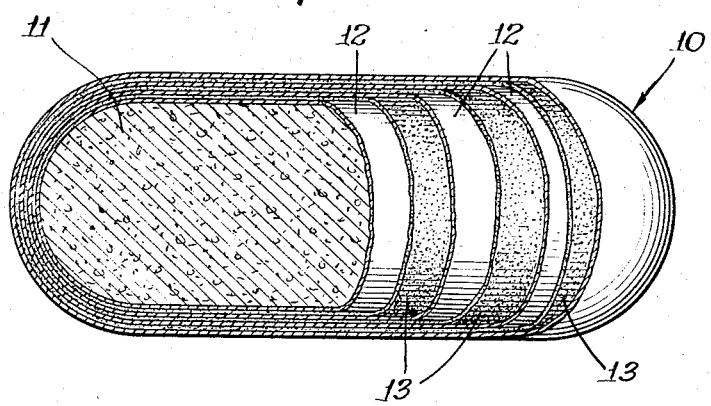
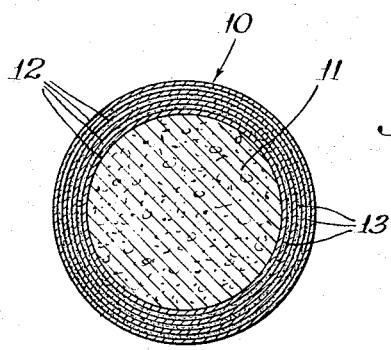
INVENTORS.
Marcus G. Grodberg
James R. Mellberg
By James I. Fawcett
Atty.

United States Patent Office 3,345,265
Patented Oct. 3, 1967

3,345,265
MULTIPLE LAYER TABLET WITH CALCIUM SALT CENTRAL CORE SEPARATED FROM SOLUBLE FLUORIDE OUTER COATING
Marcus G. Grodberg, Newton, Mass., and James R. Mellberg, North Barrington, Ill., assignors to The Kendall Company, Boston, Mass., a corporation of Massachusetts
Filed Oct. 9, 1963, Ser. No. 314,908
18 Claims. (Cl. 167—82)

This invention is concerned with prenatal, prophylactic and therapeutic tablets particularly those in which a non-toxic calcium salt such as calcium carbonate and a soluble non-toxic fluoride such as sodium fluoride are included. Optionally, other ingredients such as vitamins and other minerals may also be included.

Vitamin-mineral tablets are quite commonly available for prenatal treatment, the objective of such tablets being the provision of sufficient amount of both vitamins and minerals to the mother to insure adequate supplies for the growing fetus. A very common ingredient in such tablets is calcium carbonate, the calcium portion of which is an element considered essential in the formation of proper bones and teeth in infants.

Available evidence suggests that sodium fluoride or other readily soluble non-toxic fluoride when administered in proper dosage to the mother appears to create nascent teeth of excellent structure in the growing fetus. (Feltman, R., Kosel, G., 1961, Journal of Dental Medicine, vol. 16, pages 190-199.)

Likewise, it has recently been discovered that the condition known as osteoporosis in elderly persons and Paget's disease may be benefited in most cases by the administration of as much as 150 mg. of sodium fluoride daily with adequate supply of calcium in available form. (Rich, C., Ensinck, J., 1961, Nature, London, vol. 191, page 184. Purves, M. J., Dec. 8, 1962, Lancet, page 1188. Bernstein, D. S., Guri, C., Cohen, P., Collins, J. J., Tamvakopoulos, S., 1963 Journal of Clinical Investigation, vol. 42, page 916.)

It has been possible, of course, when administering soluble non-toxic fluorides and absorbable non-toxic calcium salts to separate their ingestion so that the full effects of each might be realized. But it has seemed desirable to provide a single tablet which would incorporate sodium fluoride or other non-toxic fluoride and calcium carbonate or other non-toxic calcium salt and, optionally, vitamins and/or additional minerals. When this has been done by the usual tablet forming methods, however, only about 6% of the fluoride and a correspondingly lesser amount of calcium has been available.

It is an object of this invention to provide prenatal, prophylactic and therapeutic tablets containing both a non-toxic calcium salt and a non-toxic soluble fluoride in wide ratios in which the fluoride is substantially available to the body in percentages of 90% and up to and approaching 100% of its presence in the tablet and the availability of the calcium is not substantially affected by the fluoride.

Ingested materials, whether from food, water or drugs are either absorbed into the blood stream by solution or, if undissolved, pass through the body with the feces. Of the material absorbed into the blood stream, some will be retained in the body and in the body of the fetus, if there is one, by the bones, teeth, muscles and other body components. That which is not retained, will be eliminated in the urine along with body breakdown products.

In measuring the availability of fluoride in any preparation, the average normal daily fluoride excretion in urine measured over a number of days must be considered. The change in fluoride excretion in urine after ingestion of an amount of fluoride in soluble form (NaF) equal to that in a dose of the preparation is then observed. After the effects of this added fluoride are gone, a dose of the preparation is ingested and the change in fluoride excretion over the normal is noted. Assuming the soluble fluoride alone is 100% available then the percentage availability of the fluoride in the preparation is proportionate to the excess over normal in the two cases. Thus, assuming a normal fluoride excretion in urine of 1.0 mg./day, total fluoride excretion of 4.5 mg. during two days after ingestion of 5 mg. of fluoride in NaF and total fluoride excretion of 4.0 mg. during two days after ingestion of 5 mg. of fluoride in the preparation, the fluoride in the preparation would be 80% available.

$$A = \frac{100(4.0-2.0)}{4.5-2.0} = 80\%$$

We have determined that the reason for low availability of the fluoride in a sodium fluoride-calcium carbonate tablet made by the usual methods is that in the presence of moisture a reaction occurs between the two whereby substantially insoluble calcium fluoride is formed before the body can absorb any but a small proportion of the fluoride. The problem of having both ingredients in the same tablet must be solved by a tablet of special construction. In accordance with the invention, such a construction is provided with a minimum of departure from the usual method of making vitamin-mineral tablets.

Referring now to the drawings:
In the drawings, FIGURE 1 is a normal-sized typical tablet of the invention.

FIGURE 2 illustrates a magnified cross section of the tablet taken along the line 2'—2 of FIGURE 1.

FIGURE 3 is a magnified cross section of the tablet taken along the lines 3—3''.

In the usual vitamin tablet manufacture the dry vitamins such as vitamin $B_1$, vitamin C, vitamin $B_2$, nicotinamide, etc. are mixed together and precompressed dry into slugs on a ¾ inch or 1 inch punch. The slugs are then oscillated until they are reduced to approximately #20 mesh granules. Vitamins A and D are usually obtained in dry granular form and these granules are mixed with the other vitamin granules.

The minerals including such minerals as sodium fluoride, calcium carbonate, ferrous sulphate and any others are mixed in the usual method with sufficient sucrose syrup to form a coherent mass and are granulated and dried and screened to #20 mesh size.

The vitamins and minerals are combined, the composition is mixed well, compressed into tablet form and immediately coated with syrup in several layers, each dusted with a non-toxic material, usually calcium carbonate. This method produces a product wherein the calcium carbonate and the sodium fluoride interact partly while the tablet is being formed and partly after the sugar coating is dissolved in the gastrointestinal tract so that only about 6% of the fluoride is available to the body.

By the method of this invention, the procedure above outlined is suitable except for two details. No sodium fluoride or other soluble fluoride is included in the tablet up to the point where the tablet is to receive its sugar or other soluble coating. Usually as many as ten layers of a soluble coating such as sugar are put on in a revolving coating pan. The usual method is to dust each layer of coating deposited and dried from syrup with calcium carbonate. The tablets of this invention have the same sugar or other soluble coatings but they are dusted with a non-toxic material inert to soluble fluoride such as talc, which is preferred, mixed with the proper amount of sodium fluoride or other soluble fluoride. Other usual dusting materials inert to the soluble fluoride such as kaolin or magnesium stearate may be used instead of talc.

The method of manufacturing by this invention results in a product in which the calcium salt and the soluble fluoride are kept apart even after the entire tablet has dissolved. The soluble fluoride may start into solution in the mouth but in any event it quickly dissolves in the stomach and upper intestinal tract down to the last coating layer. By the time the first calcium salt goes into solution, the soluble fluoride has already been dissolved and absorbed into the blood stream.

Referring once more to the drawings, the tablet of the invention 10 consists of a matrix 11 which contains all of the vitamins and minerals but not sodium fluoride or other soluble fluoride. The matrix is preferably coated with a plurality of sugar or other readily soluble coatings 12 separated by dusting layers 13 of a mixture of inert dusting material such as talc with a soluble fluoride such as sodium fluoride. But, if desired, the soluble fluoride may be included with the coating syrup preferably excepting the innermost coat but even that coat may have its proportionate share of soluble fluoride without reacting more than 5 to 10% of the fluoride with the calcium of the core.

The tablets of this invention may, as has been indicated, include vitamins and additional minerals but the essential active ingredients are an absorbable non-toxic calcium salt and a soluble fluoride and these may be present in a wide range of dosages. It is to be understood that the invention is not limited to tablets which contain the recommended daily dosage in a single tablet although for prenatal or prophylactic treatment a tablet containing the daily dosage may be preferred. But those tablets are also included which are to be taken periodically at intervals during the day for prophylactic or prenatal treatment and contain correspondingly less of the daily dosage, and those which are intended for special deficiencies in which one or more of the active ingredients is in excess of the normal daily requirements. Thus the range of calcium in the calcium salt may extend from 50 mg. to 750 mg. while the range of fluorine in the soluble fluorides may extend from 0.2 mg. to 70 mg. or more.

The expression "non-toxic" as used in the description of this invention means that the benefits to the body derived from the oral administration of the given amount of the ingredient outweight any possible detrimental effects to the body which may result.

Table I, while not representing the more extreme areas of useful preparations of the invention, is representative of the most commonly used dosages of absorbable calcium salts and soluble fluorides. It is to be understood that the invention is not confined to the formulae shown in the table.

The weights given are for the calcium and the fluoride and not for their compounds. Those quantities given are not critical, however, but are rather representative.

Fluorides representative of the soluble fluorides suitable for the purposes of this invention include ammonium fluoride and such alkali metal fluorides as sodium fluoride, which is the preferred fluoride, sodium silicofluoride and potassium fluoride. The soluble non-toxic fluorides are suitable generally, however.

Suitable non-toxic calcium salts for the purposes of this invention include the calcium salts of both organic and inorganic acids. Those generally administered orally for calcium quotas and deficiencies are preferred with calcium carbonate being the preferred salt. Other representative suitable salts are the calcium phosphates, calcium citrate, calcium lactate, calcium chloride, calcium hydroxide, calcium sulphate, calcium levulinate dihydrate and calcium gluconate monohydrate. These salts have different degrees of absorbability by the body but all are suitable. Obviously, those which are more absorbable by the body are preferred.

We claim:

1. A tablet consisting essentially of a central core, a substantially soluble coating surrounding and enveloping said core, said core including a non-toxic absorbable calcium salt, said coating including a non-toxic soluble fluoride in a coating material inert to said soluble fluoride, said calcium-containing core being separated from at least 90% of the fluoride in said fluoride-containing coating by at least one calcium-free layer containing not more than 10% of the total fluoride, said tablet being disintegrable by successive exposure to salivary, gastric and intestinal fluids to thereby successively release the soluble fluoride and the calcium salt, in order to avoid the reaction which occurs between the two in the presence of moisture.

2. The tablet of claim 1 in which the calcium salt included in the central core is calcium carbonate and the soluble fluoride included in the coating is sodium fluoride.

3. The tablet of claim 1 in which the coating comprises a plurality of substantially soluble coats separated by a dusting layer including the soluble fluoride and a non-toxic powder inert to said fluoride.

4. The tablet of claim 1 in which the soluble fluoride is separated from the central core by one of a plurality of substantially soluble coats comprising said coating.

5. The tablet of claim 1 in which the soluble fluoride is an alkali metal fluoride.

6. The tablet of claim 1 in which the soluble fluoride is sodium fluoride.

7. The tablet of claim 1 in which the soluble fluoride is selected from the group consisting of potassium fluoride, sodium silicofluoride and ammonium fluoride.

8. The tablet of claim 1 in which the calcium salt is calcium carbonate.

9. The tablet of claim 1 in which the calcium salt is selected from the group consisting of calcium phosphates, calcium citrate, calcium lactate, calcium chloride, calcium hydroxide, calcium sulphate, calcium levulinate dihydrate and calcium gluconate monohydrate.

TABLE I

| Ingredient | A | B | C | D | E | F | G |
|---|---|---|---|---|---|---|---|
| Calcium | 250 mg | 75 mg | 250 mg | 500 mg | 250 mg | 250 mg | 250 mg. |
| Fluoride | 1.0 mg | 1.0 mg | 1.0 mg | 1.0 mg | 5.0 mg | 10 mg | 25 mg. |
| Vitamin A | 600 U.S.P. units | 8,000 μ | | | | | |
| Vitamin $B_1$ | 1.3 mg | 2.5 mg | 2.5 mg | | | | |
| Vitamin $B_2$ | 2.0 mg | 2.5 mg | 2.5 mg | | | | |
| Vitamin $B_6$ | 3.0 mg | 1.0 mg | 3.0 mg | | | | |
| Vitamin $B_{12}$ | 2.0 mg | 3.0 mg | 3.0 mg | | | | |
| Vitamin C | 100 mg | 50 mg | 100 mg | | | | |
| Vitamin D | 400 U.S.P. units | 1,000 μ | | 660 μ | | | |
| Niacinamide | 20 mg | 20 mg | | | | | |
| Calcium pantothenate | 5.0 mg | 5.0 mg | | | | | |
| Iron | 40 mg | 15 mg | 40 mg | | | | |
| Phosphorus | | 58 mg | | | | | |
| Iodine | | 0.15" | | | | | |
| Copper | | 0.75" | | | | | |
| Manganese | | 1.25" | | | | | |
| Magnesium | | 10.0" | | | | | |
| Zinc | | 1.0" | | | | | |
| Potassium | | 3.0" | | | | | |

10. The tablet of claim 1 in which the calcium salt is a salt of an inorganic acid.

11. The tablet of claim 1 in which the calcium salt is a salt of an organic acid.

12. The tablet of claim 1 in which the calcium salt provides a total weight of calcium in the range of from 50 to 750 milligrams.

13. The tablet of claim 1 in which the soluble fluoride provides a total weight of fluorine in the range of from 0.2 milligram to 70 milligrams.

14. The tablet of claim 1 in which the soluble fluoride is available for body absorption in at least 90% of its presence in said tablet.

15. The tablet of claim 1 in which 10% or less of the soluble fluoride reacts with the calcium salt before the former is absorbed into the blood stream.

16. The tablet of claim 1 in which the central core contains at least one mineral in addition to the absorbable calcium salt.

17. The tablet of claim 1 in which the central core contains at least one vitamin.

18. The tablet of claim 1 in which the central core contains at least one mineral in addition to the absorbable calcium salt and at least one vitamin.

References Cited

UNITED STATES PATENTS

| | | | |
|---|---|---|---|
| 312,041 | 2/1885 | Upjohn | 167—83 X |
| 462,990 | 11/1891 | Oppenheimer | 167—83 |
| 2,410,417 | 11/1946 | Andersen | 167—81 |
| 2,449,184 | 9/1948 | Stream | 167—55 |
| 2,627,493 | 2/1953 | Merckel et al. | 167—93 |
| 2,676,136 | 4/1954 | Myhre | 167—81 |
| 2,700,012 | 1/1955 | Merckel et al. | 167—93 |
| 2,841,528 | 7/1958 | Myhre | 167—82 |
| 2,887,436 | 5/1959 | Klioze et al. | 167—81 |
| 2,967,131 | 1/1961 | Elbreder et al. | 167—93 |
| 3,247,064 | 4/1966 | Maekawa et al. | 167—81 |

LEWIS GOTTS, *Primary Examiner.*

S. K. ROSE, *Assistant Examiner.*